(12) United States Patent
Jesudason

(10) Patent No.: US 9,665,383 B2
(45) Date of Patent: May 30, 2017

(54) METHODS AND SYSTEMS FOR INTERACTING WITH AN IMAGING DEVICE

(75) Inventor: Basil Isaiah Jesudason, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 516 days.

(21) Appl. No.: 12/346,563

(22) Filed: Dec. 30, 2008

(65) Prior Publication Data
US 2010/0169785 A1 Jul. 1, 2010

(51) Int. Cl.
*G06F 15/16* (2006.01)
*G06F 9/44* (2006.01)

(52) U.S. Cl.
CPC .................. *G06F 9/4445* (2013.01)

(58) Field of Classification Search
CPC ....... H04L 67/02; H04L 67/025; H04L 67/36; H04L 69/04; H04L 67/00
USPC ................. 709/208, 217, 218, 204; 358/1.15
See application file for complete search history.

(56) References Cited

U.S. PATENT DOCUMENTS

| | | | |
|---|---|---|---|
| 5,699,494 A | 12/1997 | Colbert et al. | |
| 6,195,694 B1 * | 2/2001 | Chen ................... | G07F 17/0014 709/203 |
| 6,453,127 B2 * | 9/2002 | Wood et al. ...................... | 399/8 |
| 6,789,962 B2 * | 9/2004 | Matsunaga et al. ............ | 400/70 |
| 7,319,535 B2 | 1/2008 | Cherry et al. | |
| 7,426,059 B2 * | 9/2008 | Broda et al. ................... | 358/1.3 |
| 7,672,005 B1 * | 3/2010 | Hobbs et al. ................ | 358/1.15 |
| 8,171,169 B2 * | 5/2012 | Bullard et al. ................ | 709/247 |
| 8,336,029 B1 * | 12/2012 | McFadden et al. .......... | 717/124 |

(Continued)

FOREIGN PATENT DOCUMENTS

| | | |
|---|---|---|
| JP | 2002-281195 A | 9/2002 |
| JP | 2004-056345 A | 2/2004 |

OTHER PUBLICATIONS

Japanese Office Action—Patent Application No. 2009-298762—Mailing Date Nov. 15, 2011.

*Primary Examiner* — Liangche A Wang
(74) *Attorney, Agent, or Firm* — Law Office of Gerald Maliszewski; Gerald Maliszewski

(57) ABSTRACT

Aspects of the present invention relate to systems and methods for remote interaction with an imaging device. According to a first aspect of the present invention, an imaging device may receive, from a remote computing device, an HTTP request for an interface image associated with an interface on the imaging device. A functional replica of the interface, at a time associated with the request, may be sent, to the remote computing device, in an HTTP response. According to a second aspect of the present invention, a computing device may send, to an imaging device, an HTTP request for an interface image, and the computing device may receive, in an HTTP response, an interface image. According to a third aspect of the present invention, a gateway computing device may receive, from a remote computing device, an HTTP request for an interface image associated with an interface on an imaging device. The gateway computing device may request, from the imaging device, update information associated with the interface, and the gateway computing device may convert update information received from the imaging device to an updated interface image.

24 Claims, 8 Drawing Sheets

(56) References Cited

U.S. PATENT DOCUMENTS

| | | |
|---|---|---|
| 2001/0055492 A1* | 12/2001 | Wood et al. .................... 399/8 |
| 2002/0038346 A1* | 3/2002 | Morrison .............. G06F 3/1454 |
| | | 709/205 |
| 2004/0100651 A1* | 5/2004 | Leone et al. ................ 358/1.15 |
| 2006/0101523 A1 | 5/2006 | Talbert |
| 2006/0195495 A1* | 8/2006 | Asano .................. G06F 3/1454 |
| | | 708/111 |
| 2006/0224250 A1* | 10/2006 | Callaghan ........................ 700/1 |
| 2007/0078768 A1* | 4/2007 | Dawson .......................... 705/50 |
| 2008/0016155 A1* | 1/2008 | Khalatian .................... 709/204 |
| 2009/0080023 A1* | 3/2009 | Watabe ....................... 358/1.15 |
| 2009/0125799 A1* | 5/2009 | Kirby ........................... 715/234 |
| 2009/0237728 A1* | 9/2009 | Yamamoto .................. 358/1.15 |

* cited by examiner

METHODS AND SYSTEMS FOR INTERACTING WITH AN IMAGING DEVICE

FIELD OF THE INVENTION

Embodiments of the present invention comprise methods and systems for interacting with an imaging device, in particular, for interacting with an imaging device from a remote computing device.

BACKGROUND

It may be desirable to control an imaging device remotely from a remote computing device. Methods and systems for replicating the imaging device user interface at the remote computing device may desirable. In particular, replicating the imaging device user interface at the remote computing device without requiring specialized imaging-device-associated software may be desirable.

SUMMARY

Embodiments of the present invention comprise methods and systems for interacting with an imaging device.

In some embodiments, an imaging device may receive a request from a remote computing device for an interface image associated with the imaging device. The interface image may comprise an image of those portions of the imaging device required for effective user interface with the imaging device. In some embodiments of the present invention, an interface image may be a functional replica of an interface associated with the imaging device. In some embodiments, the functional replica may be visually similar to the interface. In alternative embodiments, the functional replica may not be visually similar to the interface, while still providing the functionality of the interface. In some embodiments, the interface image may comprise an image of the UI panel of the imaging device. The imaging device may obtain an interface image in response to the request and may send the interface image to the remote computing device. In some embodiments of the present invention, the request may comprise an HTTP request, and the interface image may be sent to the remote computing device in an HTTP response.

In some embodiments, an imaging device may receive, from a remote computing device, a change request associated with an interface at the imaging device and an interface image displayed at the remote computing device. The imaging device may send a change indicator to the remote computing device indicating whether or not the interface image currently available at the remote computing device is a functional replica of the current interface at the imaging device. In some embodiments, the change request may comprise an HTTP request, and the change indicator may be sent to the remote computing device in an HTTP response.

In some embodiments, an imaging device may receive, from a remote computing device, user-input information associated with the interface image obtained at the remote computing device, and the imaging device may be controlled in accordance with the received user-input information. In some embodiments, the user-input information may be received through a query string in the request line of an HTTP request.

In alternative embodiments of the present invention, a remote computing device may send a request to an imaging device for an interface image associated with the imaging device. The interface image may comprise an image of those portions of the imaging device required for effective user interface with the imaging device. In some embodiments of the present invention, an interface image may be a functional replica of an interface associated with the imaging device. In some embodiments, the functional replica may be visually similar to the interface. In alternative embodiments, the functional replica may not be visually similar to the interface, while still providing the functionality of the interface. In some embodiments, the interface image may comprise an image of the UI panel of the imaging device. The remote computing device may receive an interface image in response to the request and may display the interface image in a web page at the remote computing device. In some embodiments of the present invention, the request may comprise an HTTP request, and the interface image may be received in an HTTP response.

In some embodiments, a remote computing device may send, to an imaging device, a change request associated with an interface at the imaging device and an interface image displayed at the remote computing device. The remote computing device may receive from the imaging device a change indicator indicating whether or not the interface image currently available at the remote computing device is a functional replica of the current interface at the imaging device. In some embodiments, the change request may comprise an HTTP request, and the change indicator may be received in an HTTP response. In some embodiments, the remote computing device may request an updated interface image in response to a positive change indicator.

In some embodiments, a remote computing device may send, to an imaging device, user-input information received at the computing device in association with a display interface image. In some embodiments, the user-input information may be sent in a query string in the request line of an HTTP request.

In some embodiments of the present invention, a remote computing device and an imaging device may be connected through a gateway computing device, wherein the gateway computing device may receive requests from the remote computing device related to an interface at the imaging device. The gateway computing device may obtain interface-related information from the imaging device in response to requests from the remote computing device, and the gateway computing device may send the interface-related information to the remote computing device.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 11:
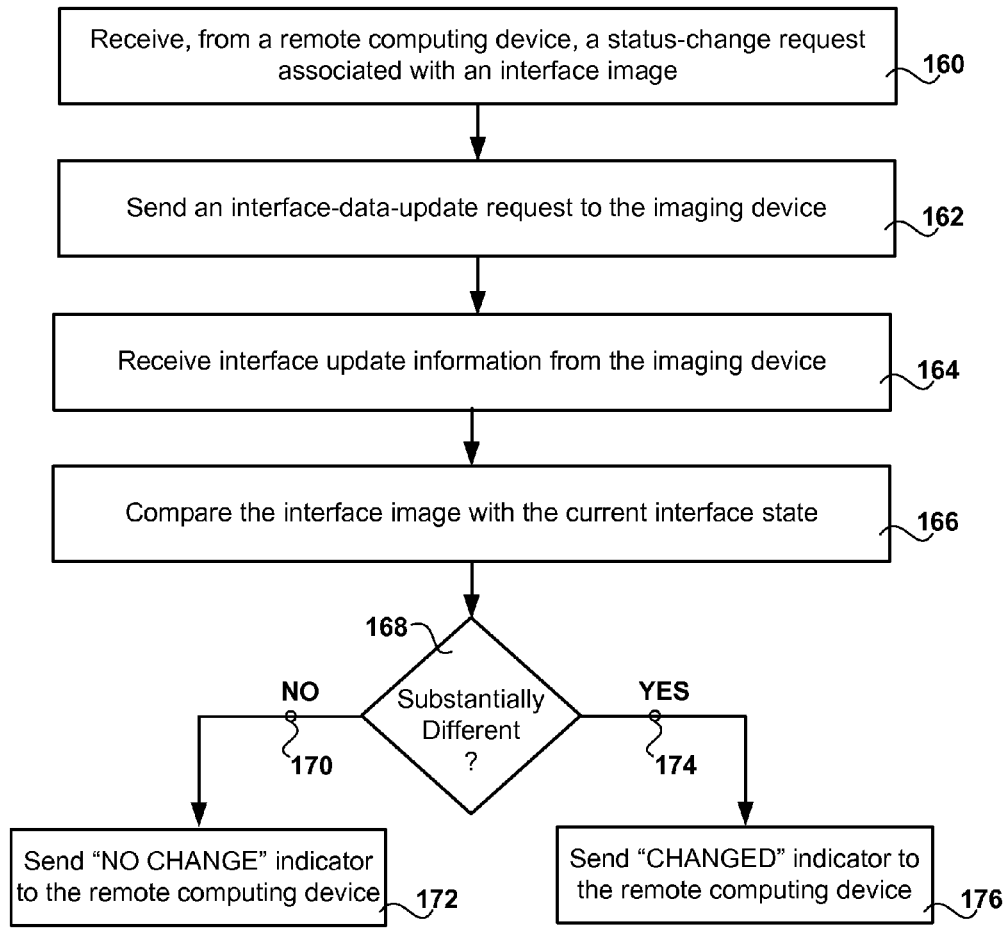
Figure 12:
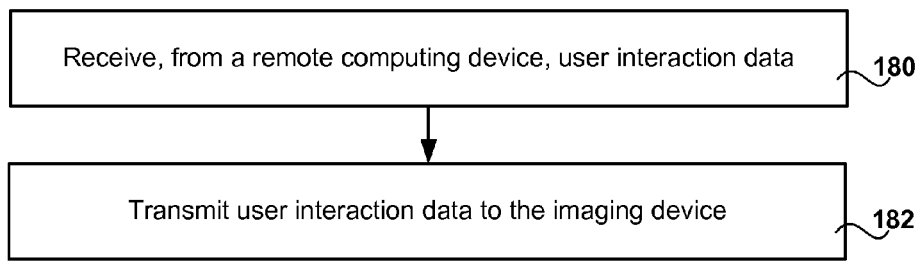

FIG. 11 is a chart showing exemplary embodiments of the present invention comprising a remote computing device polling for interface changes on an imaging device through a gateway computing device; and FIG. 12 is a chart showing exemplary embodiments of the present invention comprising a gateway computing device transmitting user-input information received from a remote computing device to an imaging device.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

It may be desirable to control an imaging device remotely from a remote computing device. Methods and systems for replicating the imaging device user interface at the remote computing device may be desirable. In particular, replicating the imaging device user interface at the remote computing device without requiring specialized imaging-device-associated software may be desirable.

Exemplary embodiments of the present invention may comprise an imaging device and a remote computing device. In some embodiments of the present invention shown in FIG. 1, an imaging device 10 and a remote computing device 12 may be communicatively coupled through a network 14. Exemplary networks include local area networks (LANs), wide area networks (WANs), the Internet, cellular networks, satellite networks, wireless proximity networks (for example, Bluetooth, Wi-Fi, WiMAX and other wireless proximity networks) and other networks. In alternative embodiments, the imaging device 10 and the remote computing device 12 may be communicatively coupled via a communication link, for example, a telephone line, a serial cable, an IrDA (Infrared Data Association) link, and other, wired or wireless, communications links.

In some embodiments, the imaging device 10 may comprise a multi-function peripheral (MFP) device that combines the functions of two or more traditionally separated imaging devices. An MFP may combine any number of imaging devices, but typically comprises the functions of one or more of the following exemplary imaging devices: a printer, a scanner, a copier, a filing device, a document-management device, a publishing device, a media-duplication device, a display device and a fax machine. In alternate embodiments, the imaging device 10 may comprise a single-function imaging device. Exemplary single-function imaging devices may be a printer, a scanner, a copier, a filing device, a document-management device, a publishing device, a media-duplication device, a display device and a fax machine.

The imaging device 10 may comprise a user interface (UI) panel 16, which may comprise input buttons 18 and/or a display device 20. In some embodiments, the display device 20 may comprise a touch panel system with or without input buttons. In some embodiments of the present invention, the imaging device 10 may comprise a user interface, wherein the components of the user interface may be proximately located. In alternative embodiments of the present invention, the components of the user interface may not be proximately located. An exemplary user interface panel 16 may be the front panel on an imaging device 10.

Exemplary remote computing devices include personal computers, for example, desktop computers, laptop computers, tablet computers, handheld computers and other personal computers, cellular telephones, personal digital assistant (PDA) devices and other computing devices. The remote computing device 12 may comprise a display 22 and a device 24, or devices, by which a user may provide user input. Exemplary input devices may include a mouse, a keyboard, a pointing device, a joystick, a touch screen and other input devices. The remote computing device 12 may comprise a web browser (not shown).

Communication and transport of data between the imaging device 10 and the remote computing device 12 may be by any protocol or combination of protocols, of which exemplary protocols may comprise WS/SOAP (Web Services/Simple Object Access Protocol), SOAP/XML (Simple Object Access Protocol/eXtensible Markup Language), DIME (Direct Internet Message Encapsulation), FTP (File Transfer Protocol), NFS (Network File System), SMTP (Simple Mail Transfer Protocol), HTTP/HTML (HyperText Transfer Protocol/HyperText Markup Language), Email, a proprietary protocol over TCP/IP (Transmission Control Protocol/Internet Protocol) and AppleTalk®.

Figure 1:
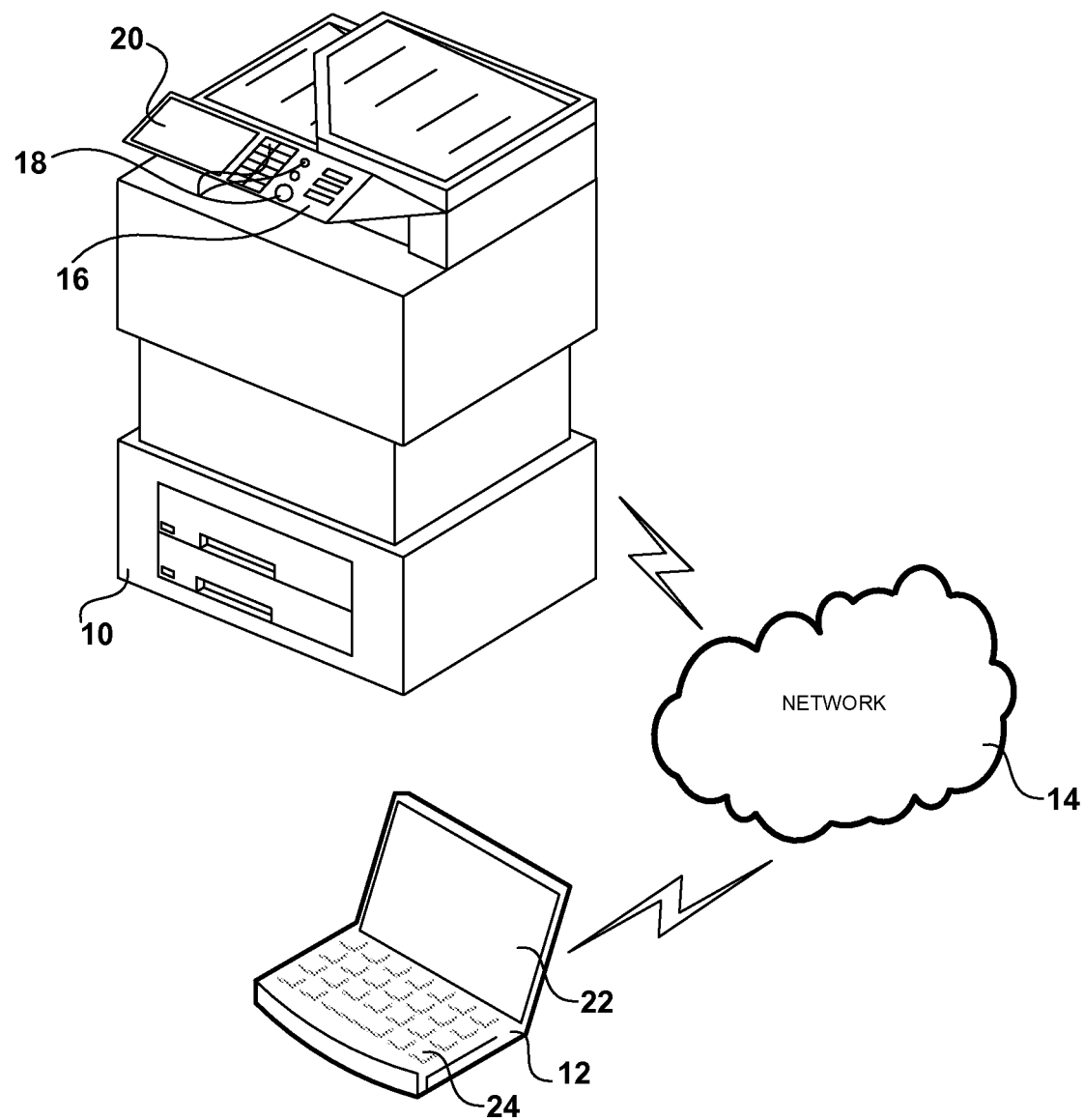
FIG. 1 is a picture showing embodiments of the present invention comprising an imaging device connected via a network to a remote computing device.
Figure 2:
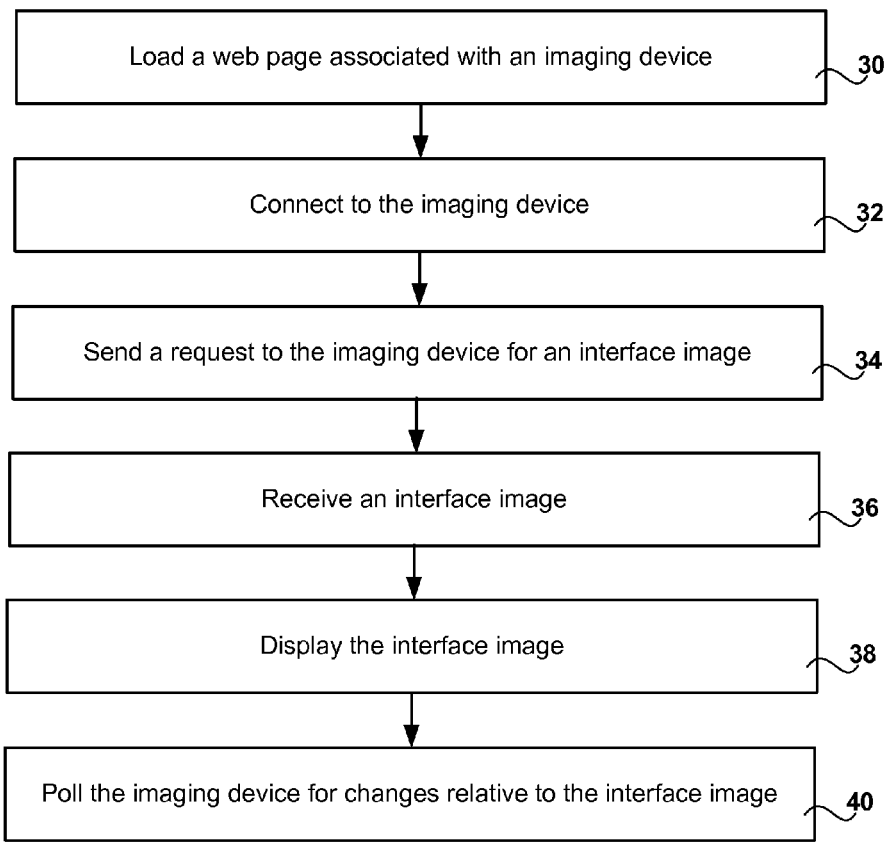
FIG. 2 is a chart showing exemplary embodiments of the present invention comprising a remote computing device requesting an interface image from an imaging device, wherein the interface image is a functional replica of an interface on the imaging device.

Some embodiments of the present invention may be described in relation to FIG. 1 and FIG. 2. In these embodiments, a web page associated with an imaging device 10 may be loaded 30 at a remote computing device 12. A JavaScript inside the web browser at the imaging device 10 may connect 32 to the imaging device 10 and may send 34 a request for an interface image associated with the imaging device 10. In some embodiments of the present invention, the request for the interface image may comprise an HTTP request.

An interface image associated with an imaging device 10 may comprise an image of those portions of the imaging device 10 required for effective user interface with the imaging device 10. In some embodiments of the present invention, an interface image may be a functional replica of an interface associated with the imaging device 10. In some embodiments, the functional replica may be visually similar to the interface. In alternative embodiments, the functional replica may not be visually similar to the interface, while still providing the functionality of the interface. In some embodiments, the interface image may comprise an image of the UI panel 16 of the imaging device.

The remote computing device 12 may receive 36 an interface image from the imaging device 10. In some embodiments of the present invention, the interface image may be received 36 in an HTTP response. In some embodiments of the present invention, the interface image may be a JPEG image. The interface image may be in any image format known in the art. Exemplary image formats may include JPEG, JPEG-2000, PNG, BMP, TIFF, GIF and SVG (Scalable Vector Graphics). The remote computing device 12 may display 38 the interface image in the web page from which the request for the interface image was initiated.

The JavaScript associated with the web page from which the interface image was requested may poll 40 the imaging device 10 for interface changes relative to the currently displayed interface image. In some embodiments, the polling may occur approximately once a second. In some embodiments, the polling frequency may be configurable. In some of these embodiments, the polling frequency may be adjusted based on network 14 traffic loads. In some embodiments, the polling may invoke an HTTP script which may check to see if an interface image associated with the imaging device 10 interface differs from the currently displayed interface image at the remote computing device 12. In some embodiments of the present invention, the polling request may comprise an HTTP request.

Figure 3:
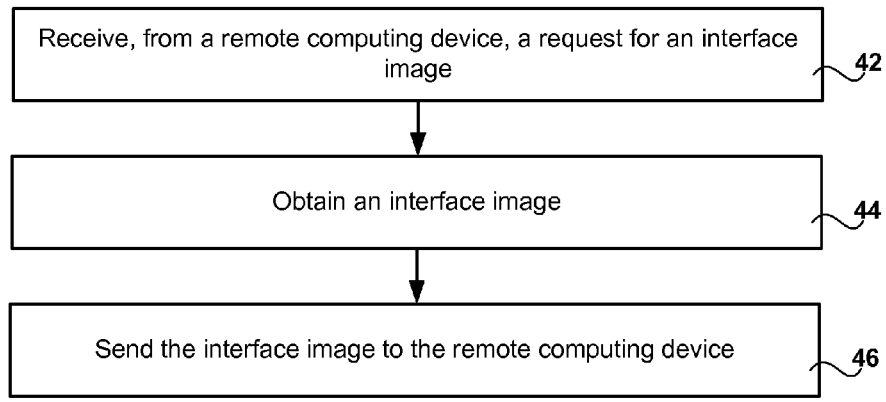
FIG. 3 is a chart showing exemplary embodiments of the present invention comprising an imaging device receiving, from a remote computing device, a request for an interface image and the imaging device obtaining and sending an interface image to the remote computing device.

Some embodiments of the present invention may be described in relation to FIG. 1 and FIG. 3. In these embodiments, an imaging device 10 may receive 42 a request for an interface image from a remote computing device 12. In some embodiments of the present invention, the request for the interface image may comprise an HTTP request. The imaging device 10 may obtain 44 an interface image corresponding to the state of the imaging-device interface at a time associated with the receipt of the request, and the imaging device 10 may send the interface image to the remote computing device 46. In some embodiments of the present invention, the interface image may be a JPEG image. The interface image may be in any image format known in the art. Exemplary image formats may include JPEG, JPEG-2000, PNG, BMP, TIFF, GIF and SVG. In some embodiments of the present invention, the interface image may be sent 46 to the remote computing device 12 in an HTTP response.

In some embodiments of the present invention, obtaining 48 an interface image may comprise obtaining a "screen shot" of the imaging device 10 interface. In alternative embodiments of the present invention, images corresponding to interface states may be pre-stored in imaging device 10 storage, which may be located within the imaging device 10 or remote to the imaging device 10.

Figure 4:
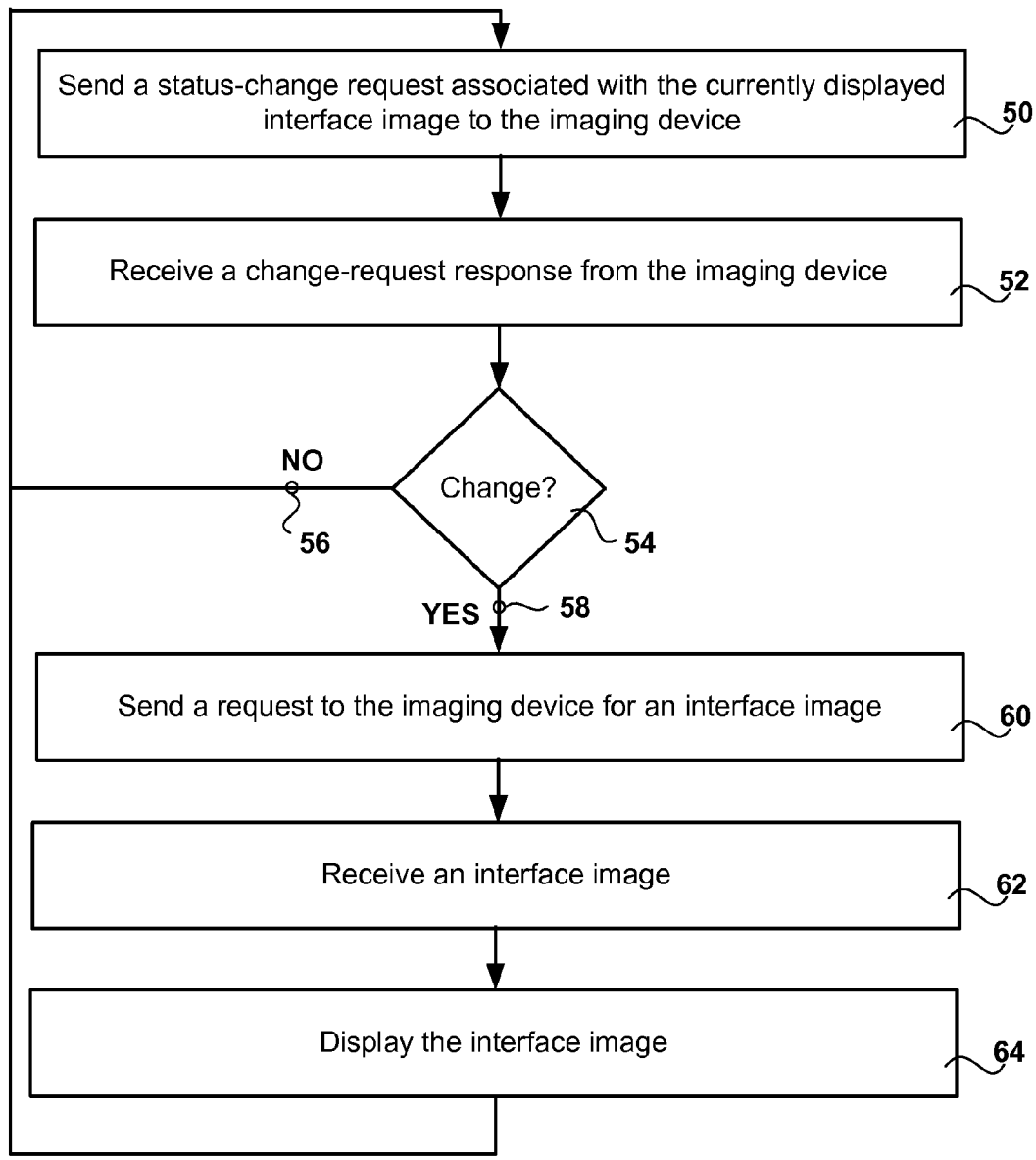
FIG. 4 is a chart showing exemplary embodiments of the present invention comprising a remote computing device polling an imaging device for interface changes.

Some embodiments of the present invention may be described in relation to FIG. 1 and FIG. 4. In these embodiments, a remote computing device 12 may send 50 a status-change request to an imaging device 10. In some embodiments, the status-change request may comprise an HTTP request. The status-change request may be associated with an interface image displayed at the remote computing device 12. The status-change request may request to receive a change indicator that indicates if the interface image currently displayed at the remote computing device 12 is a functional replica of the current interface at the imaging device 10 at a time associated with the receipt of the request. The remote computing device 12 may receive 52 a change-request response from the imaging device 10. In some embodiments, the change-status response may comprise an HTTP response, wherein a status-change indicator may be communicated in the response body. In some embodiments, the status-change indicator may be a "0" indicating no change and that the currently displayed interface image is a functional replica of the imaging device 10 interface. In some embodiments, the status-change indicator may be a "1" indicating that the currently displayed interface image is no longer a functional replica of the imaging device interface.

The remote computing device 12 may examine 54 the received status-change indicator, and if the status-change indicator indicates "no change" 56, then another status-change request may be sent 50 to the imaging device 10 at the next-scheduled polling time. If the status-change indicator indicates "change" 58, then a request may be sent 60 to the imaging device 10 for an interface image. In some embodiments, the request for an interface image may comprise an HTTP request. A current interface image may be received 62 at the remote computing device 12 from the imaging device 10, and the current interface image may be displayed 64. In some embodiments, the new interface image may be received 62 in an HTTP response. In some embodiments of the present invention, the interface image may be a JPEG image. The interface image may be in any image format known in the art. Exemplary image formats may include JPEG, JPEG-2000, PNG, BMP, TIFF, GIF and SVG. Polling of the imaging device 10 may continue 50.

Figure 5:
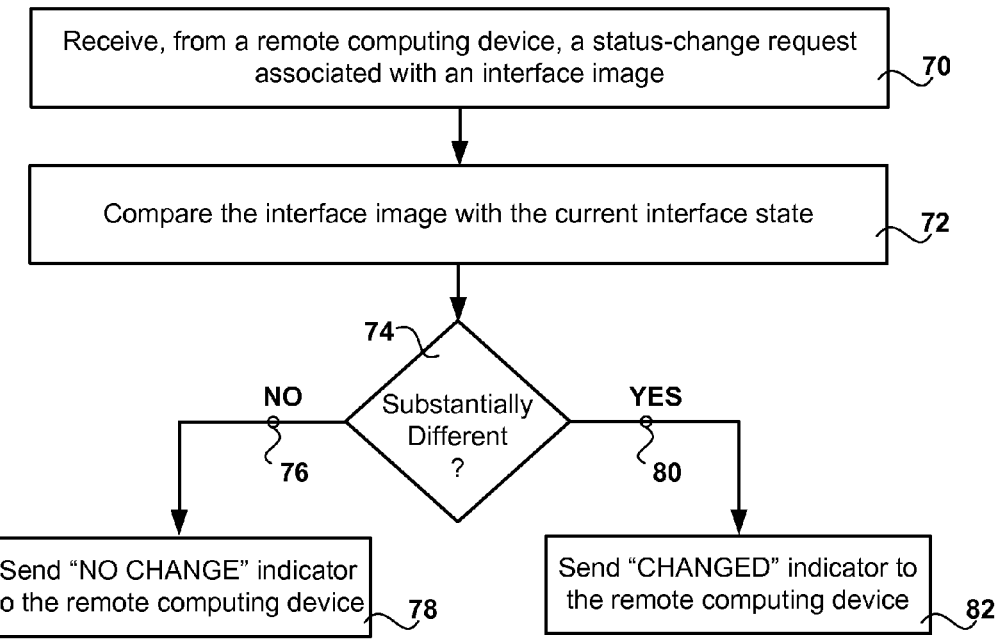
FIG. 5 is a chart showing exemplary embodiments of the present invention comprising sending, from an imaging device to a remote computing device, a status indicator indicating the status of an interface image currently displayed at the remote computing device relative to the interface at the imaging device.

Some embodiments of the present invention may be described in relation to FIG. 1 and FIG. 5. In these embodiments, an imaging device 10 may receive 70, from a remote computing device 12, a status-change request. The status-change request may be associated with an interface image. In some embodiments, the status-change request may comprise an HTTP request. The imaging device 10 may compare 72 the interface image with the current interface state to determine 74 if the interface image is a functional replica of the imaging device 10 interface at a time associated with the receipt of the status-change request. If the current interface is not 76 substantially different from the interface image, a status-change indicator indicating "no change" may be sent 78 from the imaging device 10 to the remote computing device 12. If there are substantial differences 80, then a status-change indicator indicating that the interface image is no longer a functional replica of the interface may be sent 82 from the imaging device 10 to the remote computing device 12. In some embodiments of the present invention, the status-change indicator may be sent in an HTTP response in the response body.

Figure 6:
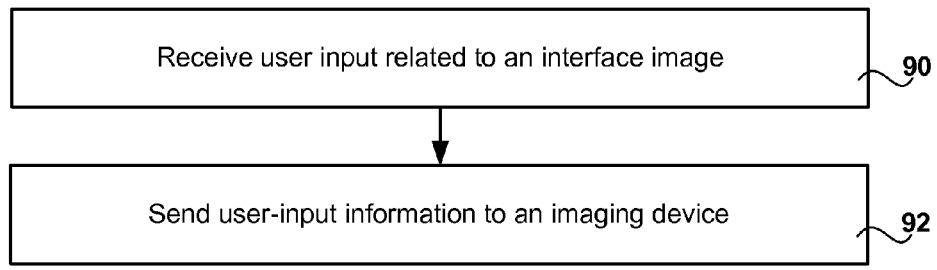
FIG. 6 is a chart showing exemplary embodiments of the present invention comprising receiving user input at a remote computing device and sending user-input information associated with the received user input from the remote computing device to an imaging device.

Some embodiments of the present invention may be described in relation to FIG. 1 and FIG. 6. In these embodiments, user input may be received 90 at a remote computing device 12. The user input may be related to an interface image, displayed at the remote computing device 12, associated with an imaging device 10. Information associated with the user input may be sent 92 from the remote computing device 12 to the imaging device 10. In some embodiments of the present invention, the user-input information may be encoded as standard query string parameters in a request line of an HTTP request. Exemplary user input may comprise a spatial location associated with a mouse click, a key code associated with a keyboard interaction, mouse-button status associated with a mouse click, a spatial location associated with a touch-panel touch, a joystick position associated with a joystick click and other user input.

In some embodiments of the present invention, after user-input information is sent 92 to the imaging device 10 from the remote computing device 12, a request may be sent to the imaging device 10 for an interface image irrespective of the polling cycle.

Figure 7:
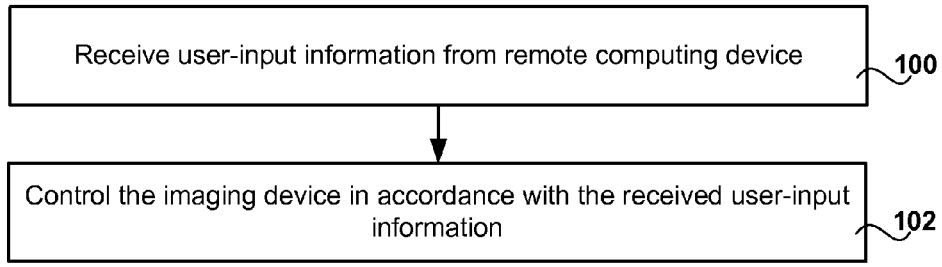
FIG. 7 is a chart showing exemplary embodiments of the present invention comprising receiving user-input information at an imaging device from a remote computing device and controlling the imaging device in accordance with the user-input information.

Some embodiments of the present invention may be described in relation to FIG. 1 and FIG. 7. In these embodiments, user-input information may be received 100 at an imaging device 10 from a remote computing device 12. The imaging device 10 may be controlled 102 in accordance with the received 100 user-input information. In some embodiments of the present invention, the interface at the imaging device 10 may be updated in accordance with the received 100 user-input information. The update may reflect the user-input information in a manner consistent with corresponding, direct user input at the imaging device 10 interface.

In some embodiments of the present invention, a remote computing device 12 may send a connection-status request to an imaging device 10. The connection-status request may be sent through an HTTP request in some embodiments. The connection-status request may request the status of an interface associated with the imaging device 10, for example, the front panel. The imaging device 10 may receive the request and send a response indicating the connection status. In some embodiments, the response may be sent in the body of an HTTP response.

Figure 8:
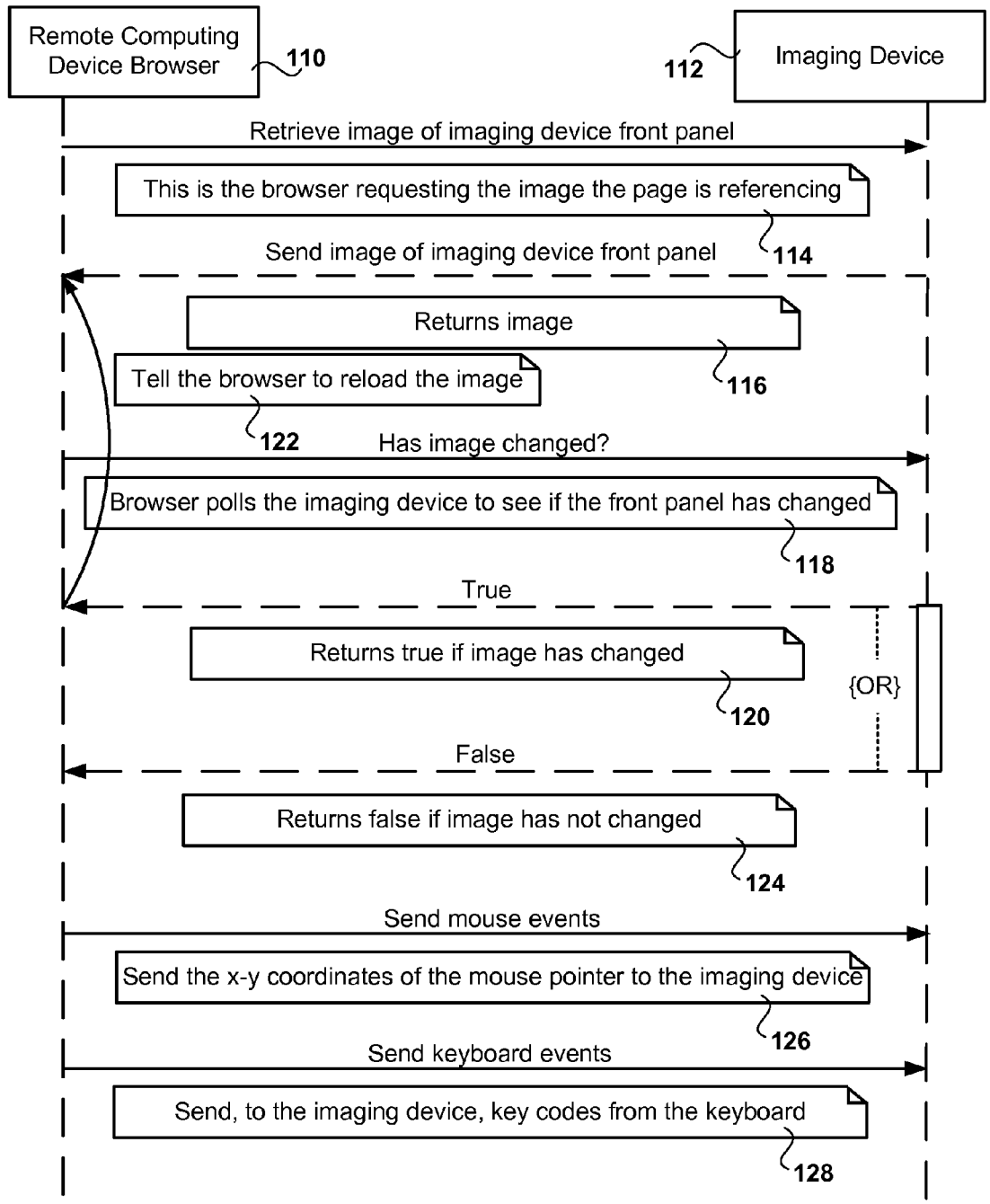
FIG. 8 is a chart showing exemplary embodiments of the present invention comprising a remote computing device requesting front panel information from an imaging device and sending user-input information from the remote computing device to the imaging device.

Some embodiments of the present invention may be understood in relation to FIG. 1 and FIG. 8. In these embodiments, a web browser 110 on a remote computing device may request 114, from an imaging device 112, an imaging of the imaging device front panel. The request may comprise an HTTP request. The imaging device 112 may return 116 an image of the imaging device 112 front panel to the browser 110. In some embodiments, the image may be returned 116 to the browser 110 in the body of an HTTP response. The browser 10 may poll 118 the imaging device 112 for changes in the front panel. The polling may comprise an HTTP request. If the front panel has changed, the imaging device 112 may return a "true" value 120. In some embodiments, the "true" response may be received at the browser 110 in the body of an HTTP response. When a "true" value is returned 120, the browser 110 may be instructed 122 to reload the image, thereby initiating another request 114 for an image of the front panel. If the value returned is "false" 124, polling 118 may continue. In some embodiments, the "false" response may be received at the browser 110 in the body of an HTTP response. When mouse events are received at the browser 110, the mouse events may be sent 126 to the imaging device 112. In some embodiments, the mouse events may be sent 126 through a query string in the request line of an HTTP request. When keyboard events are received at the browser 100, the keyboard events may be sent 128 to the imaging device 112. In some embodiments, the keyboard events may be sent 128 through a query string in the request line of an HTTP request.

In some embodiments of the present invention, wherein communication between an imaging device and a remote computing device comprises standard web-based protocols, validation and authentication of a user may be performed at the imaging device using any of the known-in-the-art methods of validation and authentication. The imaging device may further comprise security mechanisms that may secure embedded web pages, and in some embodiments, these mechanisms may be used to ensure authorized and authenticated access to an HTML page that may host the interface image.

Figure 9:
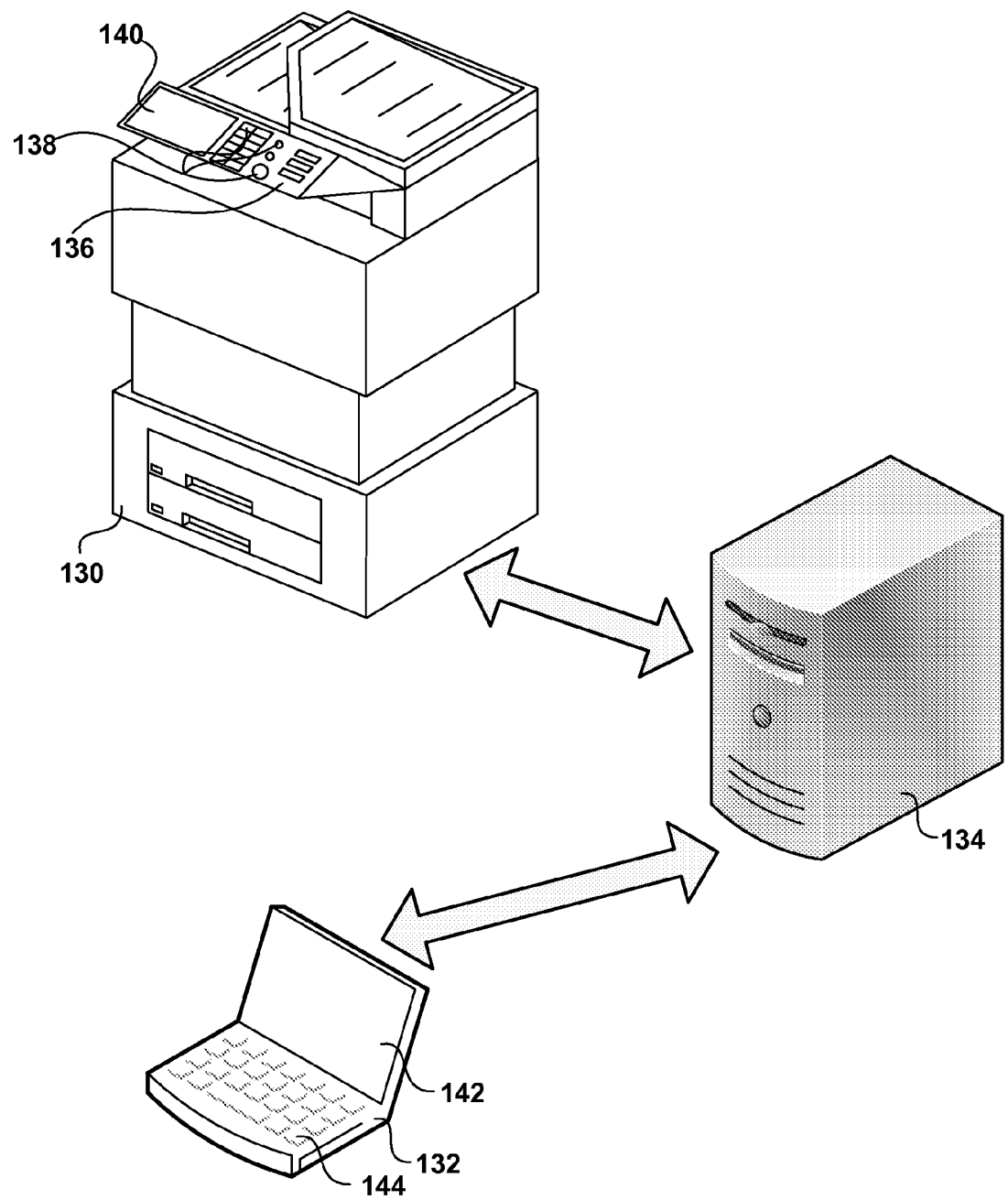
FIG. 9 is a picture of exemplary embodiments of the present invention comprising an imaging device and a remote computing device communicating via a gateway computing device.

Alternative embodiments of the present invention may be described in relation to FIG. 9. A gateway computing device 134 may be communicatively coupled with an imaging device 130 and a remote computing device 132. In some embodiments, the gateway computing device 134, the imaging device 130 and the remote computing device 132 may be communicatively coupled through a network connection. Exemplary networks include local area networks (LANs), wide area networks (WANs), the Internet, cellular networks, satellite networks, wireless proximity networks (for example, Bluetooth, Wi-Fi, WiMAX and other wireless proximity networks) and other networks. In alternative embodiments, the gateway computing device 134, the imaging device 130 and the remote computing device 132 may be communicatively coupled via a communication link, for example, a telephone line, a serial cable, an IrDA (Infrared Data Association) link, and other, wired or wireless, communications links.

In some embodiments of the present invention, the imaging device 130 may host a Virtual Network Computing (VNC) server for a remote-front-panel application. The gateway computing device 134 may run a remote-front-panel web service application.

In some embodiments, the imaging device 130 may comprise a multi-function peripheral (MFP) device that combines the functions of two or more traditionally separated imaging devices. An MFP may combine any number of imaging devices, but typically comprises the functions of one or more of the following exemplary imaging devices: a printer, a scanner, a copier, a filing device, a document-management device, a publishing device, a media-duplication device, a display device and a fax machine. In alternate embodiments, the imaging device 10 may comprise a single-function imaging device. Exemplary single-function imaging devices may be a printer, a scanner, a copier, a filing device, a document-management device, a publishing device, a media-duplication device, a display device and a fax machine.

The imaging device 130 may comprise a user interface (UI) panel 136, which may comprise input buttons 138 and/or a display device 140. In some embodiments, the display device 140 may comprise a touch panel system with or without input buttons. In some embodiments of the present invention, the imaging device 130 may comprise a user interface, wherein the components of the user interface may be proximately located. In alternative embodiments of the present invention, the components of the user interface may not be proximately located. An exemplary user interface panel 136 may be the front panel on an imaging device 130.

Exemplary remote computing devices include personal computers, for example, desktop computers, laptop computers, tablet computers, handheld computers and other personal computers, cellular telephones, personal digital assistant (PDA) devices and other computing devices. The remote computing device 132 may comprise a display 142 and a device 144, or devices, by which a user may provide user input. Exemplary input devices may include a mouse, a keyboard, a pointing device, a joystick, a touch screen and other input devices. The remote computing device 132 may comprise a web browser (not shown).

Communication and transport of data between the imaging device 130 and the gateway computing device 134 may be by any protocol or combination of protocols, of which exemplary protocols may comprise WS/SOAP (Web Services/Simple Object Access Protocol), SOAP/XML (Simple Object Access Protocol/eXtensible Markup Language), DIME (Direct Internet Message Encapsulation), FTP (File Transfer Protocol), NFS (Network File System), SMTP (Simple Mail Transfer Protocol), HTTP/HTML (HyperText Transfer Protocol/HyperText Markup Language), Email, a proprietary protocol over TCP/IP (Transmission Control Protocol/Internet Protocol), VNC (Virtual Network Computing) protocol and AppleTalk®.

Communication and transport of data between the remote computing device 132 and the gateway computing device 134 may be by any protocol or combination of protocols, of which exemplary protocols may comprise WS/SOAP (Web Services/Simple Object Access Protocol), SOAP/XML (Simple Object Access Protocol/eXtensible Markup Language), DIME (Direct Internet Message Encapsulation), FTP (File Transfer Protocol), NFS (Network File System), SMTP (Simple Mail Transfer Protocol), HTTP/HTML (HyperText Transfer Protocol/HyperText Markup Language), Email, a proprietary protocol over TCP/IP (Transmission Control Protocol/Internet Protocol) and AppleTalk®.

Figure 10:
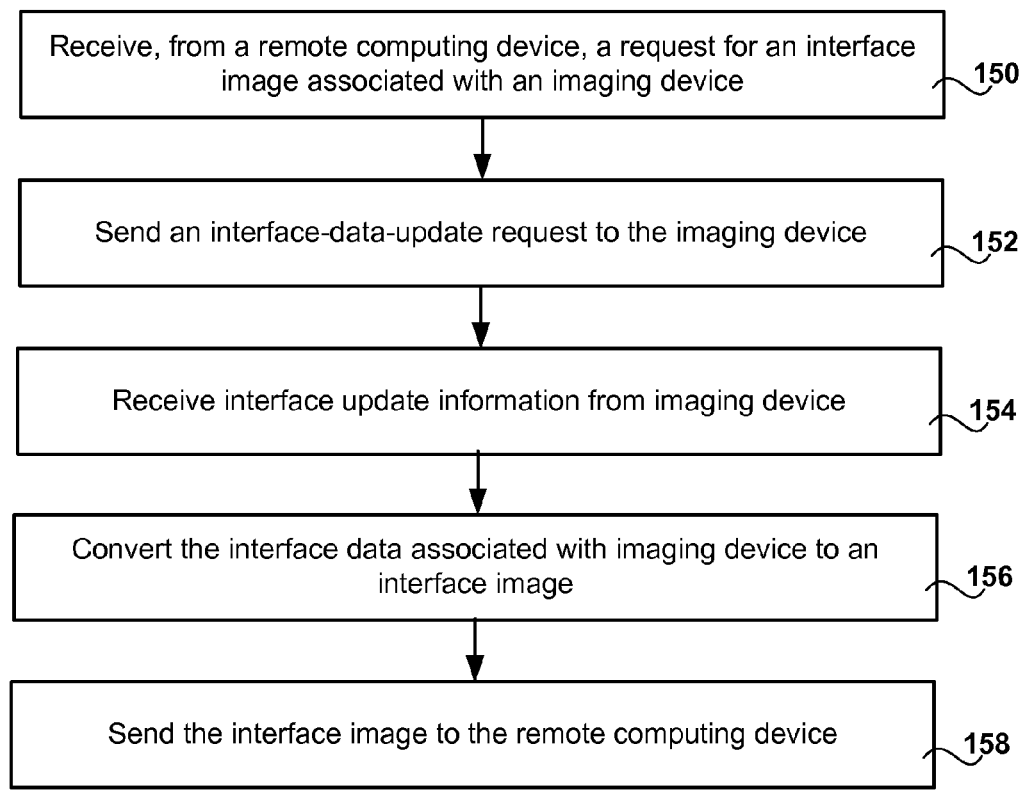
FIG. 10 is a chart showing exemplary embodiments of the present invention comprising a gateway computing device receiving a request from a remote computing device for an interface image associated with an imaging device and the gateway computing device obtaining an interface image and sending it to the remote computing device.

In some embodiments of the present invention described in relation to FIG. 9 and FIG. 10, a gateway computing device 134 may receive 150 a request from a remote computing device 132 for an interface image associated with an imaging device 130. In some embodiments, the request may comprise an HTTP request. The gateway computing device 134 may send 152, to the imaging device 130, an interface-data-update request requesting update information related to an interface associated with the imaging device 130. In some embodiments, the interface-data-update request may be sent to the imaging device 130 from the gateway computing device 134 using a VNC/RFB (Remote FrameBuffer) protocol. The gateway computing device 134 may receive 154, from the imaging device 130, interface update information. The gateway computing device 134 may convert 156 interface data associated with the imaging device to an interface image and may send 158 the interface image to the remote computing device 132. In some embodiments, the gateway computing device 134 may convert interface data from RFB to SOAP compliant binary data.

In some embodiments of the present invention described in relation to FIG. 9 and FIG. 11, a gateway computing device 134 may receive 160, from a remote computing device 132, a status-change request associated with an interface image. In some embodiments, the status-change request may comprise an HTTP request. The gateway computing device 134 may send 162, to an imaging device 130, an interface-data-update request requesting update information related to an interface associated with the imaging device 130. In some embodiments, the interface-data-update request may be sent to the imaging device 130 from the gateway computing device 134 using a VNC/RFB (Remote FrameBuffer) protocol. The gateway computing device 134 may receive 164, from the imaging device 130, interface update information. The gateway computing device 134 may compare 166 the interface image currently associated with the remote computing device 132 with the current state of the interface at the imaging device 130. If the gateway computing device 134 determines 168 that there is not 170 a substantial difference between the interface image currently associated with the remote computing device 132 with the current state of the interface at the imaging device 130, then the gateway computing device may send 172 a "no change" indicator to the remote computing device 132. If the gateway computing device 134 determines 168 that there is 174 a substantial difference between the interface image currently associated with the remote computing device 132 with the current state of the interface at the imaging device 130, then the gateway computing device may send 176 a "changed" indicator to the remote computing device 132. In some embodiments of the present invention, the status indicator may be sent in an HTTP response.

In some embodiments of the present invention described in relation to FIG. 9 and FIG. 12, a gateway computing device 134 may receive 180, from a remote computing device 132, user interaction data. In some embodiments, the user interaction data may be received through a query string in a request line of an HTTP request. The gateway computing device 134 may send 182 the user interaction data to an imaging device 130.

The user interaction data may be related to an interface image, displayed at the remote computing device 132, associated with an imaging device 130. Exemplary user input may comprise a spatial location associated with a mouse click, a key code associated with a keyboard interaction, mouse-button status associated with a mouse click, a spatial location associated with a touch-panel touch, a joystick position associated with a joystick click and other user input.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for remote interaction with an imaging device, said method comprising:
at an imaging device, receiving, from a remote computing device, a first HTTP request for an interface image, where said imaging device is capable of performing a function selected from the group consisting of printing, scanning, publishing, media-duplication, filing, displaying, faxing, and combinations thereof;
obtaining a first interface image associated with an interface on said imaging device, wherein: said first interface image represents a functional replica of said interface at a first time associated with receipt of said first HTTP request for an interface image; said first interface image corresponds to a state of said interface at said first time; said first interface image comprises an image corresponding to a plurality of portions of said imaging device required for said remote computing device to interface with said imaging device; and said interface on said imaging device allows said remote computing device to control an imaging device function;

sending said first interface image from said imaging device to said remote computing device, wherein said sending said first interface image comprises a first HTTP response to said first HTTP request;

obtaining a second interface image associated with said interface, wherein said second interface image represents a functional replica of said interface at a second time associated with receipt of a first interaction indicator; and sending said second interface image from said imaging device to said remote computing device.

2. A method as described in claim 1, wherein said interface on said imaging device is a front panel interface.

3. A method as described in claim 1, wherein said first interface image is visually similar to said interface.

4. A method as described in claim 1, wherein said first interface image is not visually similar to said interface.

5. A method as described in claim 1, wherein said first interface image has an image format selected from the group consisting of JPEG, JPEG-2000, PNG, BMP, TIFF, GIF and SVG.

6. A method as described in claim 1 further comprising:
at said imaging device, receiving, from said remote computing device, a first change request associated with said first interface image and said interface;
determining a change status associated with said first interface image and said interface, wherein said change status indicates whether said first interface image is a substantially current functional replica of said interface; and
sending said change status from said imaging device to said remote computing device.

7. A method as described in claim 6, wherein said first change request comprises a second HTTP request.

8. A method as described in claim 6, wherein said sending said change status comprises a second HTTP response.

9. A method as described in claim 1 further comprising:
at said imaging device, receiving, from said remote computing device, said first interaction indicator associated with said first interface image; and
controlling said imaging device in accordance with said first interaction indicator.

10. A method as described in claim 9, wherein said receiving a first interaction indicator comprises a third HTTP request.

11. A method as described in claim 1, wherein said sending said second interface image comprises a third HTTP response.

12. A method for remote interaction with an imaging device, said method comprising:
from a computing device, sending, to an imaging device, a first HTTP request for an interface image, where said imaging device is capable of performing a function selected from the group consisting of printing, scanning, publishing, media-duplication, filing, displaying, faxing, and combinations thereof;
at said computing device, receiving, from said imaging device, in a first HTTP response to said first HTTP request, a first interface image, wherein: said first interface image represents a functional replica of a corresponding interface on said imaging device; said first interface image corresponds to a state of said corresponding interface at a first time associated with receipt of said first HTTP request at said imaging device; said first interface image comprises an image corresponding to a plurality of portions of said imaging device required for said computing device to interface with said imaging device; and said corresponding interface on said imaging device allows said computing device to control an imaging device function;
displaying said first interface image at said computing device; and
at said computing device, receiving from said imaging device a second interface image associated with said interface, wherein said second interface image represents a functional replica of said interface at a second time associated with the receipt of a first interaction indicator by said imaging device.

13. A method as described in claim 12, wherein said interface image is associated with a front panel interface on said imaging device.

14. A method as described in claim 12, wherein said first interface image is visually similar to said corresponding interface on said imaging device.

15. A method as described in claim 12, wherein said first interface image is not visually similar to said corresponding interface on said imaging device.

16. A method as described in claim 12, wherein said first interface image has an image format selected from the group consisting of JPEG, JPEG-2000, PNG, BMP, TIFF, GIF and SVG.

17. A method as described in claim 12 further comprising:
from said computing device, sending, to said imaging device, a first change request associated with said first interface image; and
at said computing device, receiving a change status from said imaging device.

18. A method as described in claim 17, wherein said first change request comprises a second HTTP request.

19. A method as described in claim 17, wherein said receiving said change status comprises a second HTTP response.

20. A method as described in claim 12 further comprising:
receiving, from a user-interface device, an interaction indicator associated with said displayed first interface image; and
from said computing device, sending, to said imaging device, said first interaction indicator.

21. A method as described in claim 20, wherein said sending said first interaction indicator comprises a third HTTP request.

22. A method for remote interaction with an imaging device, said method comprising:
receiving, at a gateway computing device from a remote computing device, an HTTP request for an interface image representing a functional replica associated with an interface on an imaging device, wherein: said interface image comprises an image corresponding to a plurality of portions of said imaging device required for a user to interface with said imaging device; said interface image corresponds to a state of said interface on said imaging device at a first time associated with receipt, at said imaging device, of a first HTTP request for said interface image; and said interface on said imaging device allows said remote computing device to control an imaging device function;
sending, from said gateway computing device to said imaging device, a request to update a first interface image associated with said interface on said imaging device, where said imaging device is capable of performing a function selected from the group consisting of printing, scanning, publishing, media-duplication, filing, displaying, faxing, and combinations thereof;

receiving, at said gateway computing device from said imaging device, interface-image update information;

at said gateway computing device, converting said interface-image update information to a second interface image associated with said interface on said imaging device;

sending said second interface image from said gateway computing device to said remote computing device;

receiving at said gateway computing device, interface-image update information from said imaging device, in response to the imaging device receiving a first interaction indicator;

at said gateway computing device, converting said interface update information to a third interface image associated with said interface, wherein said third interface image represents a functional replica of said interface at a second time; and sending said third interface image from said gateway computing device to said remote computing device.

23. A method as described in claim 22, wherein:

said request to update a first interface image comprises a VNC/RFB protocol; and said sending said second interface image comprises an HTTP response.

24. A method for remote interaction with an imaging device, said method comprising:

at an imaging device, receiving, from a remote computing device, a first request for an interface image;

obtaining a first interface image associated with an interface on said imaging device, wherein: said first interface image represents a functional replica of said interface at a first time associated with receipt of said first request for an interface image; said first interface image corresponds to a state of said interface at said first time; said first interface image comprises an image corresponding to a plurality of portions of said imaging device required for said remote computing device to interface with said imaging device; and said interface on said imaging device allows said remote computing device to control said imaging device;

sending said first interface image from said imaging device to said remote computing device, wherein said sending said first interface image comprises a first response to said first request;

at said imaging device, receiving, from said remote computing device, a first interaction indicator associated with said first interface image;

in response to said first interaction indicator, the imaging device performing a function selected from a group consisting of a scanner, copier, filing device, document-management device, publishing device, media-duplication device, and fax machine;

obtaining a second interface image associated with said interface on said imaging device, wherein said second interface image represents a functional replica of said interface at a second time associated with receipt of said first interaction indicator; and sending said second interface image from said imaging device to said remote computing device.

* * * * *